United States Patent
Pei et al.

(10) Patent No.: US 11,760,628 B2
(45) Date of Patent: Sep. 19, 2023

(54) METHOD FOR GENERATING HYDROGEN FROM A NITROGEN CONTAINING BORANE COMPOUND AND ACTIVE METAL BOROHYDRIDE MIXTURE

(71) Applicant: HYDROGEN IN MOTION INC. (H2M), Vancouver (CA)

(72) Inventors: Pei Pei, Surrey (CA); Erik Kjeang, Delta (CA); Mark Cannon, Vancouver (CA); Grace Quan, Vancouver (CA)

(73) Assignee: HYDROGEN IN MOTION INC. (H2M), Vancouver (CA)

( * ) Notice: Subject to any disclaimer, the term of this patent is extended or adjusted under 35 U.S.C. 154(b) by 94 days.

(21) Appl. No.: 17/416,428

(22) PCT Filed: Dec. 18, 2019

(86) PCT No.: PCT/CA2019/051841
§ 371 (c)(1),
(2) Date: Jun. 18, 2021

(87) PCT Pub. No.: WO2020/124227
PCT Pub. Date: Jun. 25, 2020

(65) Prior Publication Data
US 2022/0081287 A1    Mar. 17, 2022

Related U.S. Application Data

(60) Provisional application No. 62/783,620, filed on Dec. 21, 2018.

(51) Int. Cl.
| | | |
|---|---|---|
| C01B 3/06 | (2006.01) |
| B01D 53/26 | (2006.01) |
| B01D 53/28 | (2006.01) |
| B01D 53/58 | (2006.01) |
| B01D 53/78 | (2006.01) |

(52) U.S. Cl.
CPC ............ *C01B 3/065* (2013.01); *B01D 53/261* (2013.01); *B01D 53/265* (2013.01); *B01D 53/28* (2013.01); *B01D 53/58* (2013.01); *B01D 53/78* (2013.01); *B01D 2253/106* (2013.01); *C01P 2002/72* (2013.01); *C01P 2002/89* (2013.01)

(58) Field of Classification Search
CPC .... B01D 53/261; B01D 53/265; B01D 53/28; B01D 53/58; B01D 53/78; B01D 2253/106; C01P 2002/72; C01P 2002/89; C01B 3/04; C01B 3/50; C01B 3/065
See application file for complete search history.

(56) References Cited

U.S. PATENT DOCUMENTS

| 4,157,927 A * | 6/1979 | Chew ................. C01B 3/04 |
| | | 149/109.2 |
| 7,001,681 B2 | 2/2006 | Wood |
| 2003/0037487 A1 | 2/2003 | Amendola et al. |
| 2005/0106097 A1 | 5/2005 | Graham et al. |
| 2007/0020175 A1 | 1/2007 | Graham |
| 2012/0240455 A1 | 9/2012 | Ku |
| 2018/0277860 A1 | 9/2018 | Eickhoff et al. |

FOREIGN PATENT DOCUMENTS

| CN | 107 930 697 A * | 4/2018 | .......... B01J 35/1004 |
| CN | 110 713 170 A * | 1/2020 | ............. C01B 3/065 |
| CN | 111 389 429 A * | 7/2020 | ............. C01B 3/001 |
| WO | 2018143790 A1 | 8/2018 | |

OTHER PUBLICATIONS

Xu et al. Hydrogen generation behaviors of NaBH4—NH4BH3 composite by hydrolysis, Journal of Power Sources, vol. 261 (2014), pp. 7-13.

International Written Opinion dated Apr. 8, 2020 issued by ISA/CA on International Patent Application No. PCT/CA2019/051841 filed Dec. 18, 2019.

International Search Report dated Apr. 8, 2020 issued by ISA/CA on International Patent Application No. PCT/CA2019/051841 filed Dec. 18, 2019.

* cited by examiner

*Primary Examiner* — Timothy C Vanoy
(74) *Attorney, Agent, or Firm* — Franklin & Associates International Inc; Matthew Lambrinos

(57) ABSTRACT

A method for generating hydrogen from a mixture of nitrogen containing borane compound and active metal borohydride reactants uses a catalyst-free water vapor driven hydrothermolysis process. The method involves mechanically mixing a selected ratio of nitrogen containing borane compound such as ammonia borane and an active metal borohydride such as sodium borohydride to produce a mixture, combining the mixture with a water vapor source, and heating the mixture and water vapor source to a temperature within a near ambient temperature range of 30° C. to 104° C., until a product gas comprising hydrogen is released. The heating can be at a constant temperature or at increasing temperatures. Water vapor and impurities are removed from the product gas to produce purified hydrogen gas.

30 Claims, 7 Drawing Sheets

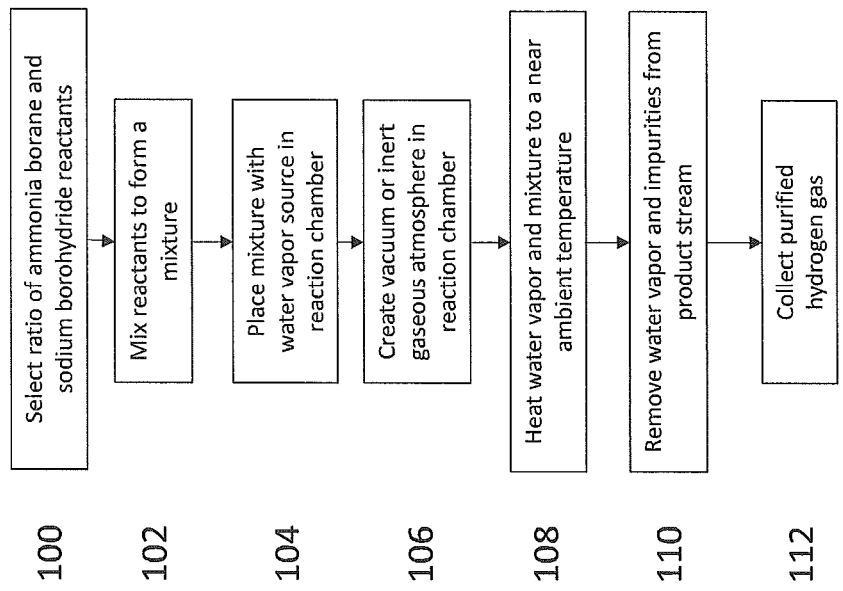

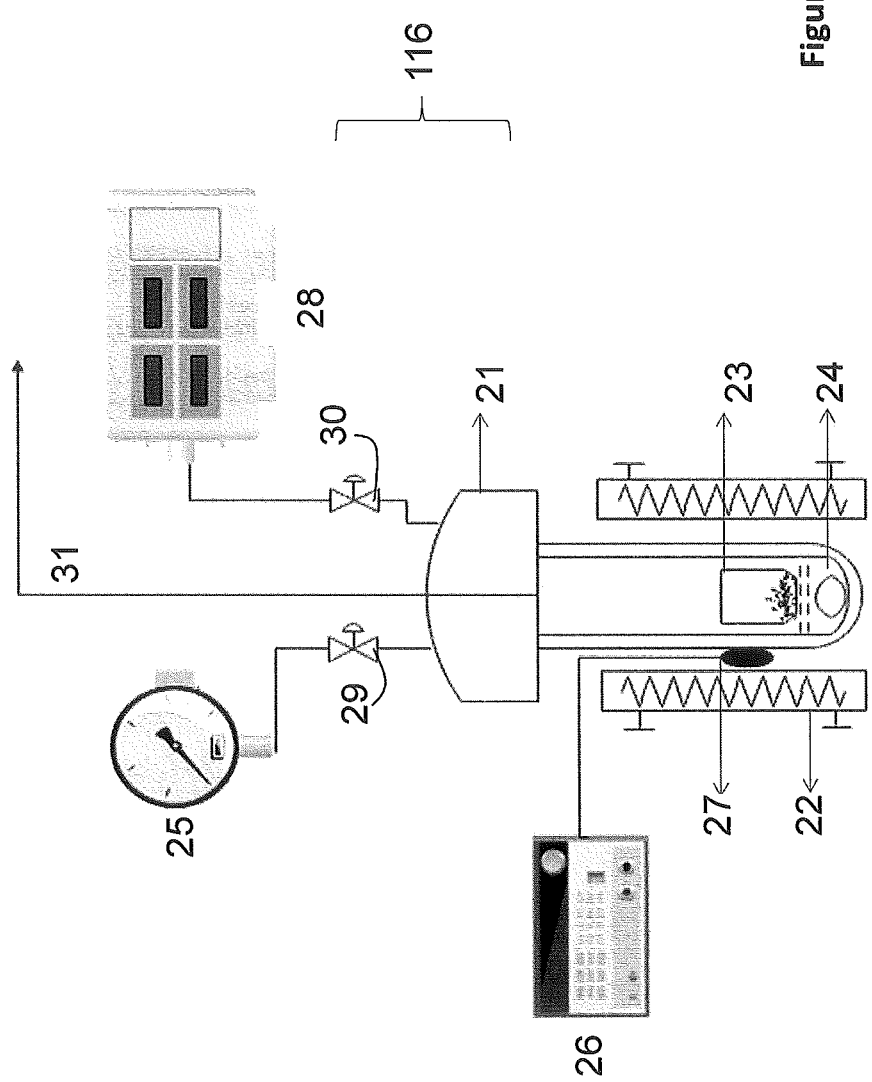

METHOD FOR GENERATING HYDROGEN FROM A NITROGEN CONTAINING BORANE COMPOUND AND ACTIVE METAL BOROHYDRIDE MIXTURE

CROSS REFERENCE TO RELATED APPLICATIONS

The present application is a national stage of International Application No. PCT/CA2019/051841, filed 18 Dec. 2019, and claims the benefit of U.S. Provisional Application No. 62/783,620, filed 21 Dec. 2018, each of which is incorporated herein by reference in its entirety.

FIELD OF THE INVENTION

This disclosure relates generally to methods for generating hydrogen from a nitrogen containing borane compound and an active metal borohydride mixture.

BACKGROUND OF THE INVENTION

Hydrogen is a clean and highly efficient energy carrier that can be produced, stored and consumed using more environmentally responsible approaches compared to traditional fossil fuels. However, before widespread hydrogen energy becomes a reality, there are key technical hurdles to be overcome, such as hydrogen storage and distribution. Especially, when hydrogen energy is considered for the application of hydrogen powered fuel cell vehicles, storage becomes a more prominent challenge due to size and weight constraints in vehicles. A typical automobile will consume about 4 kg of hydrogen in order to travel 400 km. However, 4 kg of hydrogen will occupy about 45 m$^3$ of volume under ambient temperature and pressure, rendering its direct usage unrealistic for vehicle application. Various hydrogen storage technologies have been developed to address this challenge. Known methods include storage by means of high-pressure compression and cryogenic liquefaction. Both of these storage methods have significant disadvantages. A compressed gas tank made from composite material must be capable of sustaining 700 bar gas pressure. These units are not only costly and bulky; in the case of collision, the consequence could be disastrous, due to the energy released from the compression. For cryogenic liquefaction, hydrogen must be cooled down to −252° C., and the energy consumed during this process can equal about ⅓ of the energy stored by hydrogen. Moreover, to avoid excessive pressure in the system, a liquid hydrogen tank should be an open system, which inevitably leads to evaporation loss in the amount of 0.6-3% per day.

To address hydrogen storage challenges, various solid state hydrogen storage technologies were developed including metal hydrides, chemical hydrides, high specific surface area adsorbents and hybrid absorbing materials. For most solid state hydrogen storage materials, a critical challenge is low capacity at moderate temperatures and pressures, which is far below the capacity requirement for onboard hydrogen storage for light-duty fuel cell vehicles set by the U.S. Department of Energy (DOE). Compared to other solid state materials, the gravimetric hydrogen capacities of chemical hydrides are remarkably higher. Among those, nitrogen-boron hydrides and light metal borohydride are commonly studied candidates, given their outstanding theoretical gravimetric hydrogen content. For example, ammonia borane and sodium borohydride have capacities of 19.6 and 10.8 wt. %, and volumetric hydrogen content of 152 and 133 g H$_2$ L$^{-1}$, respectively. There are generally two approaches to release hydrogen from nitrogen-boron hydrides and light metal borohydride, namely, thermolysis and hydrolysis.

The majority of related research on nitrogen-boron hydrides and light metal borohydride was dedicated to improving hydrogen release conditions, such as release temperature and kinetics when using thermolysis or hydrolysis. To this end, catalysts are generally employed, especially metallic catalysts such as nano-structured Pd, Co and Ni. The requirement of catalysts complicates the operation and process of hydrogen release, and also inevitably increases the cost, especially when using noble metal catalysts. Another caveat of employing metallic catalysts is the compromise of gravimetric hydrogen storage capacity due to the masses from catalysts and its supports. For hydrolysis, the participance of liquid phase water further lowers the gravimetric hydrogen storage capacity. Literature reports have shown that if considering the masses from catalysts and water, the effective capacity could be far below 1 wt. % for hydrolysis of ammonia borane, which makes the practical utilization problematic.

It is therefore desirable to provide a solution to at least some of the existing hydrogen storage challenges.

BRIEF DESCRIPTION OF FIGURES

The invention is described with reference to the Figures in which:

FIG. 1 is a flow chart of steps performed in a dynamic hydrogen release method for generating a product gas comprising hydrogen from a mixture of ammonia borane and sodium borohydride according to one embodiment of the invention.

SUMMARY OF THE INVENTION

Figure 2A:
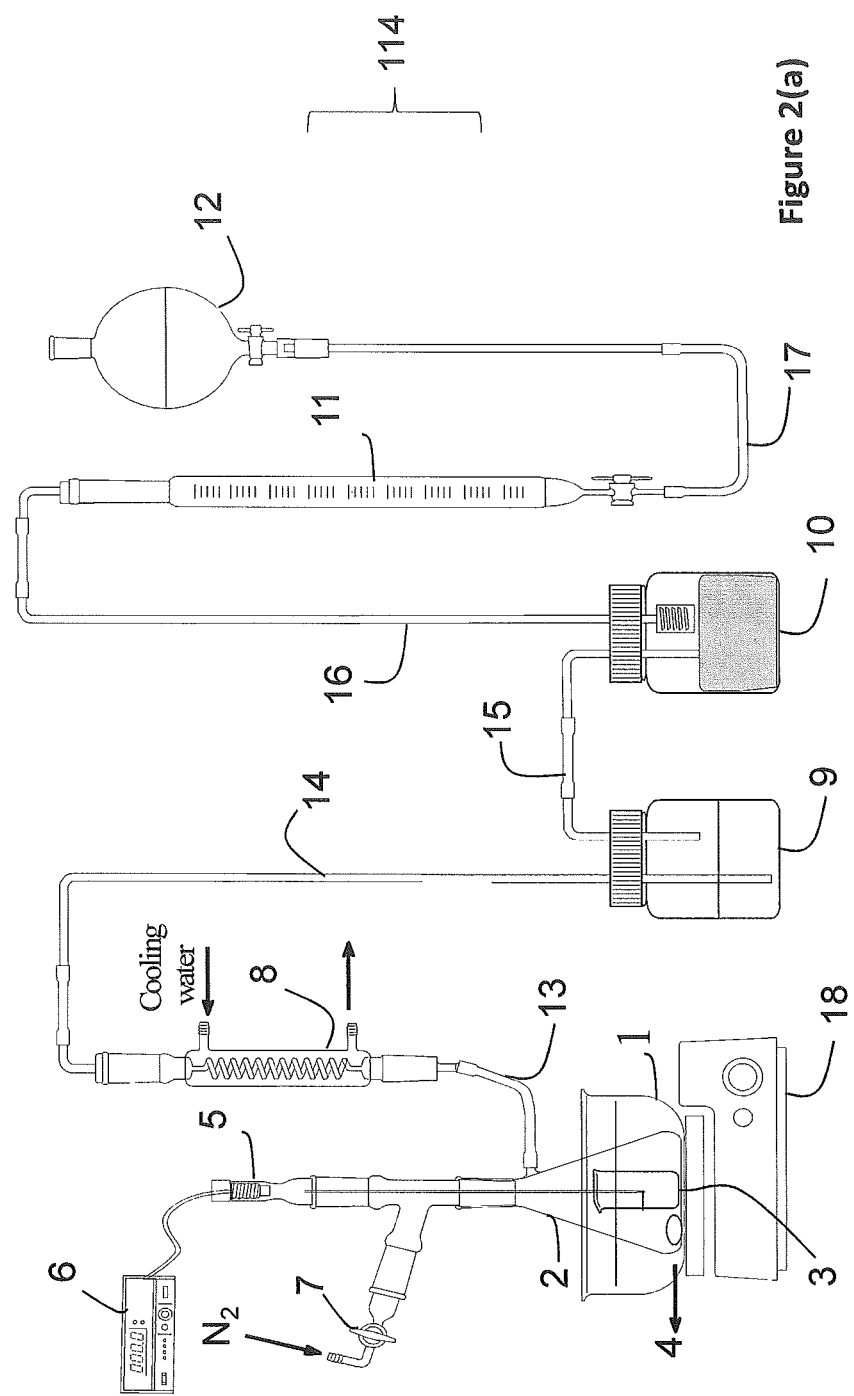
FIGS. 2(a) and (b) are schematic illustrations of first and second dehydrogenating apparatuses for performing the hydrogen release method according to embodiments of the invention.

According to one aspect of the invention, there is provided a method for generating hydrogen from a nitrogen-containing borane compound and active metal borohydride mixture, comprising: mixing a nitrogen-containing borane compound and an active metal borohydride into a mixture; combining the mixture with a water vapor source then heating the mixture and a water vapor source to a temperature within a near ambient temperature range of 30° C. and 104° C. thereby producing a product gas comprising hydrogen; and removing at least some water vapor and impurities from the product gas to produce a purified product gas.

The nitrogen containing borane compound can be selected from a group consisting of: ammonia borane, hydrazine borane and amine boranes. The active metal borohydride can be selected from alkali and alkaline metal borohydrides, consisting of: $NaBH_4$, $LiBH_4$, $KBH_4$, $RbBH_4$, $Cs\,BH_4$, $Be(BH_4)_2$, $Mg(BH_4)_2$, $Ca\,Mg(BH_4)_2$, $Sr(BH_4)_2$ and $Ba(BH_4)_2$. The mixture can comprise between 5 and 95 wt. % nitrogen containing borane compound. The water vapor source can be loaded to produce a relative humidity within a range of 10% to a saturation humidity at a corresponding temperature during the heating.

The mixture and water vapor source can be isothermally heated at a constant temperature within the near ambient temperature range; the constant temperature can be between 50° C. and 60° C. Alternatively, the mixture and water vapor source can be dynamically heated at an increasing temperature over time within the near ambient temperature range, for example, at a rate of 5° C./min or less. Alternatively, the mixture and water vapor source can be dynamically heated at an increasing temperature within the near ambient temperature range over a first time period and isothermally heated at a constant temperature within the near ambient temperature range over a second time period.

The step of removing at least some water vapor can comprise condensing water vapor from the product gas and/or passing the product gas through a silica gel. The step of the removing at least some impurities can comprise passing the product gas through a diluted sulfuric acid solution.

The mixture and water vapor source can be combined and heated in a reaction chamber, and the method can further comprise purging the reaction chamber with an inert gas prior to heating the mixture and a water vapor source. A vacuum or inert gaseous atmosphere can be created in the reaction chamber prior to receiving the mixture and water vapor source.

According to another aspect of the invention, the method for generating hydrogen can further comprise feeding the purified product gas to an anode of a polymer electrolyte membrane fuel cell.

DETAILED DESCRIPTION OF EMBODIMENTS

Embodiments disclosed herein relate generally to a method for generating hydrogen from a mixture of nitrogen-containing borane compound and active metal borohydride reactants using a water vapor-driven hydrothermolysis process without the use of a catalyst ("dehydrogenation method"). The dehydrogenation method involves mechanically mixing a selected reactant ratio of nitrogen containing borane compound such as ammonia borane and an active metal borohydride such as sodium borohydride to produce a mixture ("ABSB mixture"), combining the ABSB mixture with a selected concentration of water vapor in a reaction chamber, and applying moderate heat to the reaction chamber at a constant temperature ("isothermal heating") or at increasing temperatures over time ("dynamic heating") until a product gas comprising hydrogen is released. A suitable reactant ratio is within a range of >0 to <100%. A suitable heating temperature is within a range of 30° C. to 104° C. ("near ambient temperature range"). A suitable water vapor concentration described by relative humidity is within a range of 10% to the saturation humidity at corresponding temperature. A suitable temperature ramping rate when dehydrogenating using dynamic heating is greater than 0 and less than or equal to 5° C./min; for example, the temperature ramping rate can be 0.5° C./min. Although the embodiments described herein all use ammonia borane as the nitrogen-containing borane compound and sodium borohydride as the active metal borohydride reactant, other nitrogen-containing borane compounds, such as hydrazine borane and amine boranes, and other active metal borohydrides, such as $LiBH_4$, $KBH_4$, $RbBH_4$, $Cs\,BH_4$, $Be(BH_4)_2$, $Mg(BH_4)_2$, $Ca\,Mg(BH_4)_2$, $Sr(BH_4)_2$ and $Ba(BH_4)_2$, can be used.

One example of the method for generating hydrogen involves mixing ammonia borane and sodium borohydride in a weight ratio of 4:3 and heating the mixture with a water vapor source at a heating rate of 0.5° C./min from ambient temperature to about 55° C., which is expected to achieve a dehydrogenation rate of about 0.56 L/g/s of hydrogen gas. Another example of the method involves mixing ammonia borane and sodium borohydride in a weight ratio of 4:3 and soaking the mixture and water vapor source at a constant temperature of 55° C., which is expected to achieve a dehydrogenation capacity of 7.8 wt. %.

Without being bound by theory, it is theorized that the hydrogen gas is generated through a collaborative destabilization between ammonia borane (or other nitrogen containing borane compounds) and sodium borohydride (or other active metal borohydrides) under certain conditions. The collaborative destabilization is achieved by employing water vapor to create a water rarefied environment and moderate heat to enable hydrothermolysis. Directly using liquid phase water instead of vapor depresses the collaborative destabilization, causing extremely low hydrogen release which mainly comes from the side reaction of sodium borohydride hydrolysis. Hydrothermolysis appears to be a contributing factor for obtaining a higher desired hydrogen release, and cannot be replaced alone by hydrolysis or thermolysis according to conventional hydrogen release methods for ammonia borane and sodium borohydride. The collaborative interaction also appears to be a contributing factor, as missing one of the component chemical hydrides in the mixture is expected to result in the failure of hydrogen release even when the same operation is utilized.

Compared to known hydrogen production methods employing catalysts, embodiments of the method for generating hydrogen are expected to provide a high gravimetric hydrogen release capacity achieved by eliminating the usage of catalyst and employing water vapor instead of liquid water. Water molecules provided by vapor are efficiently used as O and H sources rather than a heat carrier (different from steam), and the required vapor concentration is moderate and easy to obtain, e.g. sealing a calculated weight of water source together with the mixture in a known volume container at near ambient temperatures. Low heat, prudent water use and absence of extra weight from catalyst make high energy efficiency expected. The kinetics of hydrogen release achieved by embodiments of the method for generating hydrogen is also very fast, even at near ambient temperatures. In experiments, the release of hydrogen was observed to start immediately with no apparent response time once the ammonia borane and sodium borohydride mixture and water vapor reached the near ambient temperature range.

Due to the absence of catalyst and the relative simplicity of the method, operation and hardware requirements for the method are expected to be relatively modest, which makes this method attractive for practical applications. For example, some embodiments of the inventive method can be used to supply hydrogen to applications requiring hydrogen, especially applications requiring an abundant and continuous supply of hydrogen, such as a fuel cell. The method is expected to be particularly useful to supply hydrogen to the anode of a polymer electrolyte membrane (PEM) type fuel cells, which have a working temperature that is within the near ambient temperature range and thus would be compatible with the temperature of the hydrogen released by the method. In this example, waste heat from the fuel cell reactions, for instance from the liquid coolant, could provide heat input and temperature control for the dehydrogenation method.

In another example, some embodiments of the method for generating hydrogen can be used in hydrogen storage applications, and offer potential improvements over conventional hydrogen storage solutions. Conventional solutions involve storing highly compressed hydrogen gas in high pressure storage tanks, and storing liquefied hydrogen in cryogenic storage tanks. Both conventional approaches present a number of challenges, including a high cost for manufacturing a storage tank capable of withstanding very high pressures, complexities and costs to cool hydrogen gas to a liquid, and evaporation losses of 0.6-3% per day when storing liquefied hydrogen in conventional storage tanks. In embodiments of the method for generating hydrogen, ammonia borane and sodium borohydride reactants are stable and can be stored separately or together in a mixture for extended periods without dissipation. Since the reactants are solid at ambient temperature and pressure, and only moderate heat and no catalyst is required to initiate the hydrogen generation reaction, the operation and hardware requirements to generate hydrogen from the stored reactants are relatively modest.

According to a first embodiment and referring to FIG. 1, a dynamic method for generating hydrogen generates a product gas from a chemical hydride mixture of ammonia borane and sodium borohydride in a water vapor driven hydrothermolysis process by heating the mixture at increasing temperatures over a period of time using a selected heating rate. The method comprises selecting a reactant ratio of ammonia borane to sodium borohydride for the mixture (step 100). While it is theorized that any amount of ammonia borane in the mixture should generate hydrogen in the hydrothermolysis process, too low or too high of the reactant ratio could cause a relatively low dehydrogenation capacity. In this embodiment, the weight percent of ammonia borane in the mixture is between 5% and 95%. Particularly suitable ammonia borane to sodium borohydride ratios include 1:1, 4:3, 3:2 and 2:3.

The ammonia borane and sodium borohydride reactants are typically in solid or paste form at room temperature and are combined and then mixed by mechanical agitation (Step 102). After mixing, the ABSB mixture is loaded into a reaction chamber together with a water vapor source (step 104). The reaction chamber can be previously flushed with an inert gas such as nitrogen. The water vapor source can be a wet cotton containing small amount of deionized water (DI water) or other equivalent aqueous carriers. The amount of DI water loaded in the water vapor source is adjustable to create a desired relative humidity that is selected from a water vapor range from 10% to the saturation humidity at corresponding temperature.

Use of water vapor is important to the hydrothermolysis of ABSB, and in particular, certain water vapor concentrations can be selected to render high dehydrogenation capacities. It has been observed that without water vapor, dry heating of ABSB mixture fails to release any notable amount of hydrogen at near ambient temperatures. It has been further observed that the released hydrogen gas contains limited hydrogen atoms from water vapor. However, the involvement of water vapor greatly facilitates the dehydrogenation interaction between AB and SB. Water vapor concentration also has a direct relation with dehydrogenation behavior; in experiments, a higher dehydrogenation capacity of 7.8 wt % was measured when the relative humidity was 48%. In comparison, lower dehydrogenation capacities of 2.9 wt % and 4.2 wt % were measured when relative humidity of 17% and 97% were respectively employed.

Optionally, a vacuum is then created in the reaction chamber (Step 106); the vacuum can be created by a turbo-molecular pump or by other means known in the art. Alternatively, the reaction chamber can be filled with an inert gas, or gases which do not oxidize the ABSB mixture or react with the ABSB mixture.

Then, the water vapor source and the ABSB mixture are heated over a period of time at successively increasing temperatures to within the near ambient temperature range (Step 108). The heating can be applied to the reaction chamber using a heating means known in the art, such as an electric or gas heating element or an electric furnace. The temperature can be increased at a ramping rate that is 5° C./min or less. Once the ABSB mixture and water vapor reach the near ambient temperature range, a product gas containing hydrogen is released and is collected (Step 110). The product gas is then passed through a condenser and other water removal means to remove water vapor and through one or more purifiers to remove impurities, thereby producing a purified hydrogen gas (Step 112). The removal of water vapor in the hydrogen gas produced is optional when water vapor is compatible with the application requirements, for example when used in fuel cell applications.

According to a second embodiment, dehydrogenation of an ammonia borane and sodium borohydride mixture is achieved by an isothermal hydrogen release method. The isothermal hydrogen release method is similar to the dynamic hydrogen release method described in the first embodiment, except that the ammonia borane, sodium borohydride and water vapor are heated at a constant temperature within the near ambient temperature range for a selected period. The constant temperature can be between 50° C. and 60° C., and more particularly between 53° C. and 55° C. One suitable temperature for a mixture of 4:3 ammonia borane to sodium borohydride is 53.5° C.

According to a third embodiment, dehydrogenation of an ammonia borane and sodium borohydride mixture is achieved by a combination of the dynamic and isothermal hydrogen release methods described in the first and second embodiments. For example, the ABSB mixture can be dynamically heated at a selected ramping rate until hydrogen gas erupts at a certain temperature, and then the ABSB mixture is held at a constant temperature until the dehydrogenation ceases. Vice versa, the ABSB mixture can also be pre-heated at a low temperature, e.g. 30° C. for a period of time, and then the temperature can be ramped up dynamically at a selected rate.

The embodiments of the dehydrogenation method can be performed by a dehydrogenating apparatus, such as a first dehydrogenating apparatus 114 shown in FIG. 2(a) and a second dehydrogenating apparatus 116 shown in FIG. 2(b). Both apparatuses 114, 116 measure the molar number of hydrogen released from the hydrothermolysis of the ABSB mixture. The first dehydrogenating apparatus 114 is configured to measure the volume change of $H_2$ gas under constant pressure, whereas the second dehydrogenating apparatus is configured to measure the pressure change of the $H_2$ gas within a constant volume. While both dehydrogenating apparatuses 114, 116 can carry out both the dynamic and isothermal hydrogen release methods, the first dehydrogenating apparatus 114 is particularly suited to carry out the isothermal hydrogen release method, and the second dehydrogenating apparatus 116 is particularly suited to carry out the dynamic hydrogen release method.

Referring to FIG. 2(a), the first dehydrogenating apparatus 114 comprises an oil bath container 1, a conical flask 2 partially submerged in an oil bath in the oil bath container 1, a beaker 3 in the conical flask containing a dry ammonia borane and sodium borohydride mixture, and a water vapor source 4 in the conical flask 2 beside the beaker 3. The conical flask has a number of sealed openings, namely: a sensor port, a purge inlet and a gas discharge outlet. The oil bath container 1 is placed on a heating element 18, which can be operated to provide constant or variable rates of heating. The flask 2 serves as a reaction chamber for reaction of the mixture and water vapor; the volume of the reaction chamber can be determined by a helium gas calibration; an empty chamber test can conducted, and the results can be used to calibrate and correct the generated gas quantity obtained from performing the method for generating hydrogen.

A pressure transducer and thermocouple 5 are attached to the sensor port and has a probe that extends inside the flask 2 and into the beaker 3. The pressure transducer and thermocouple 5 are attached to a measurement device 6 which is operable to measure the pressure and temperature inside the beaker 3. A purge valve 7 is mounted to the purge inlet and can be fluidly coupled to a nitrogen source (not shown) operable to inject a nitrogen gas into the conical flask 2 to purge the inside of the flask 2.

A first impurities collection bottle 9, a second impurities collection bottle 10, a burette 11, and a collection reservoir 12 are fluidly coupled to the flask 2 by a series of gas transfer conduits 13, 14, 15, 16, 17. In particular, a first gas transfer conduit 13 extends from the gas discharge outlet to an inlet of a condenser 8, which comprises a heat exchanger that uses cooling water to condense and remove water vapor impurities in the released hydrogen gas. A second gas transfer conduit 14 extends from an outlet of the condenser 8 and into the first impurities bottle 9. A third gas transfer conduit 15 extends from the first impurities bottle 9 to the second impurities bottle 10. A fourth gas transfer conduit 16 extends from the second impurities bottle 10 to the burette 11, and a fifth gas transfer conduit 17 extends from the burette 11 to the collection reservoir 12. The first and second impurities bottles 9, 10 contain materials which remove impurities in the product gas; for example the first impurities bottle 9 can contain diluted sulfuric acid solution to remove alkaline gas and the second impurities bottle 10 can contain silica gel to remove water vapor. The released hydrogen gas is stored in the burette 11, which can be filled with a dilute copper sulfate solution and be used to measure the quantity of released hydrogen gas. The replaced copper sulfate solution can then be collected in the collection reservoir 12.

Referring to FIG. 2(b), the second dehydrogenating apparatus 116 comprises a stainless steel reaction chamber 21 and an electric furnace 22 in thermal communication with the reaction chamber 21. A dry beaker 23 is located inside the reaction chamber 21 and contains the ABSB mixture, and a water vapor source 24 is also located inside the reaction chamber 21 below the beaker 23. A pressure gauge 25 comprises a pressure transducer (not shown) that extends through a sensor port 29 into the reaction chamber 21 to measure the pressure therein. A thermometer 26 comprises a thermocouple 26 that is communicative with the reaction chamber 21 to measure the temperature therein. A universal gas analyzer (UGA) 28 is coupled to a discharge port 30 and operates to analyze and identify impurities in the product gas. A gas conduit 31 directs hydrogen gas generated from the dehydrogenating process to equipment for collecting, measuring and purifying the generated hydrogen (not shown).

Alternatively, the gas conduit 31 can be used both as a gas inlet and outlet. The produced gas can be discharged through 31, and the operations of pumping and purging can also be carried out through conduit 31. Since the apparatus 116 is a sealed system (constant volume), vacuum can be applied thereto.

Notably, the first dehydrogenating apparatus 114 can purify the generated hydrogen gas during the dehydrogenation process, whereas the second dehydrogenating apparatus 116 must purify the generated hydrogen gas after the dehydrogenation process due to the requirement of providing a fixed volume.

It will be apparent to one skilled in the art that the apparatuses 114, 116 shown in FIGS. 2(a) and (b) are configured to perform experimental scale embodiments of the dehydrogenation method, and can be modified for different applications, such as for commercial scale production.

Figure 5:
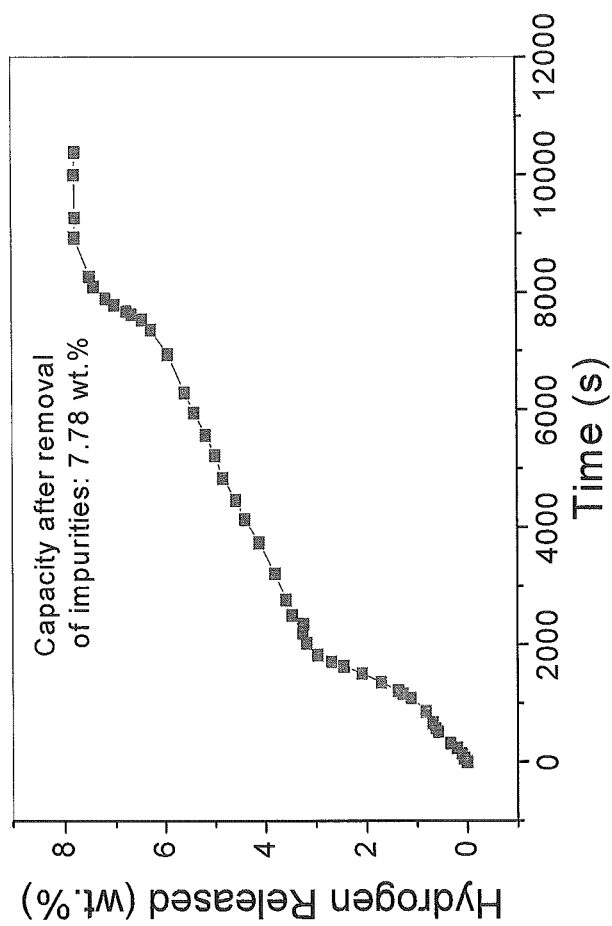
FIG. 5 is a graph of generated hydrogen gas over time, wherein the hydrogen gas is generated according to an isothermal hydrogen release method according to another embodiment of the invention.

In an illustrative operation, the first dehydrogenating apparatus 114 shown in FIG. 2(a) carries out a isothermal hydrogen release method using an ABSB mixture of 60 wt. % ammonia borane, and a water vapor source loaded with deionized water. The loading can be a concentration that produces a relative humidity of 2% or greater and for example can be 48%. The purge valve 7 is coupled to a nitrogen source, and the purge valve 7 is opened to thoroughly purge the interior of the flask with dry $N_2$ gas. The ABSB mixture is then placed into the beaker 3, and the beaker 3 and water vapor source 4 are placed into the flask 2. The flask 2 is then directly transferred from an ambient environment into the oil bath in the oil bath container 1. The heating element 18 is then operated to heat the oil bath at a constant temperature of 55° C. for a period of 3 hours. As shown in FIG. 5, the measured pure hydrogen released over this period was 7.78 wt. %.

Figure 3:
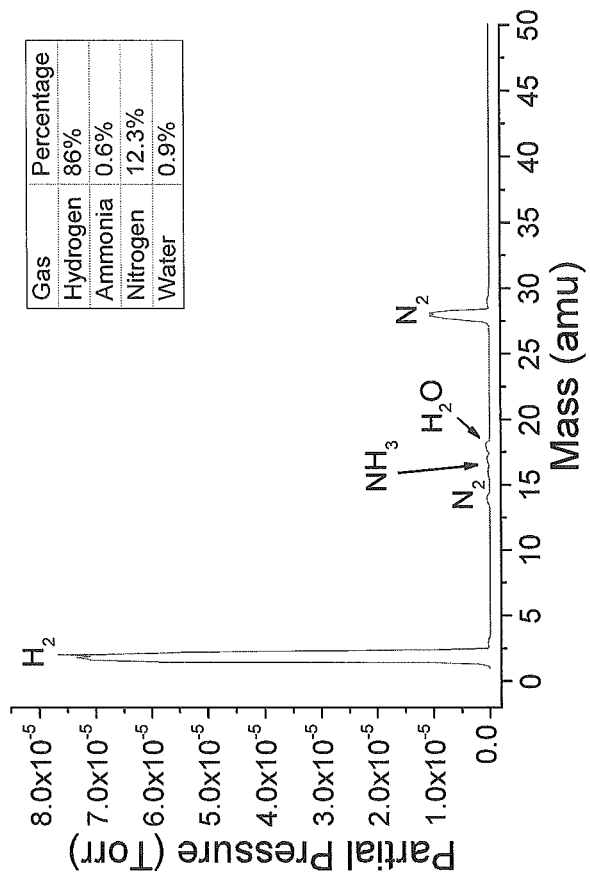
FIG. 3 is a mass spectrum graph of the product gas generated according to the method shown in FIG. 1.

Once the ABSB mixture is heated to a temperature within the near ambient temperature range, a product gas including hydrogen is released. The product gas leaves the flask 2 through the discharge outlet, through the gas transfer conduit 10, and through the condenser 8 wherein some of the water vapor in the product gas is condensed and removed. The product gas then passes through the first and second impurities bottles 9, 10, wherein the diluted sulfuric acid solution and silica gel act to remove more water vapor and impurities, leaving a purified hydrogen gas. The impurities contained in the product gas can be analyzed and identified by a universal gas analyzer (UGA, not shown) before purification. A typical impurities reading is shown in FIG. 3 before purification, which indicates the presence of a small amount of ammonia (less than 1%).

After purification, the hydrogen gas is measured in the burette 11, which is filled with dilute copper sulfate solution. The measurements include volume, pressure and temperature changes, and can be used to calculate a generated hydrogen gas quantity based on the total mass of ammonia borane and sodium borohydride.

Figure 4:
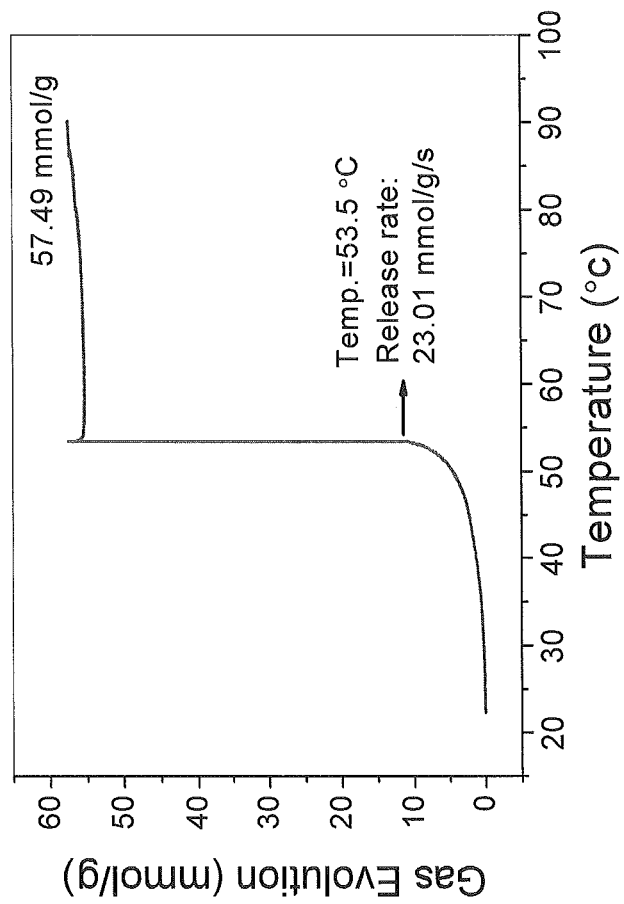
FIG. 4 is a graph of hydrogen gas quantity relative to temperature of hydrogen generated according to the method shown in FIG. 1.

In another illustrative operation, the second dehydrogenating apparatus 116 shown in FIG. 2(b) is used to carry out a dynamic method for generating hydrogen using an ABSB mixture of 60 wt. % ammonia borane with a water vapor source loaded with water to produce a relative humidity of 48%. Initially, the chamber containing the mixture and the vapor source is under vacuum. Then, the chamber is gradually heated at a heating rate of 0.5° C./min, wherein the ABSB mixture and water vapor are heated from 22° C. to a target temperature 53° C., and then from 53° C., to about 90° C. A graph of generated hydrogen gas against temperature is shown in FIG. 4. In this graph, the quantity of generated hydrogen gas is expressed by unitized millimole number based on one gram of the chemical hydride mixture. As can be seen in FIG. 4, around 10.5 mmol/g of gas is emitted during the initial temperature ramp from 22 to 53° C., and then at 53.5° C. the gas release rapidly increases to 55.7 mmol/g within 2 seconds at a rate of 23.01 mmol/g/s, equivalent to 0.56 L/g/s. Continuously raising the temperature from 53.5 to 90° C. only causes slight additional hydrogen gas generated from 55.7 mmol/g to 57.49 mmol/g.

Figure 6:
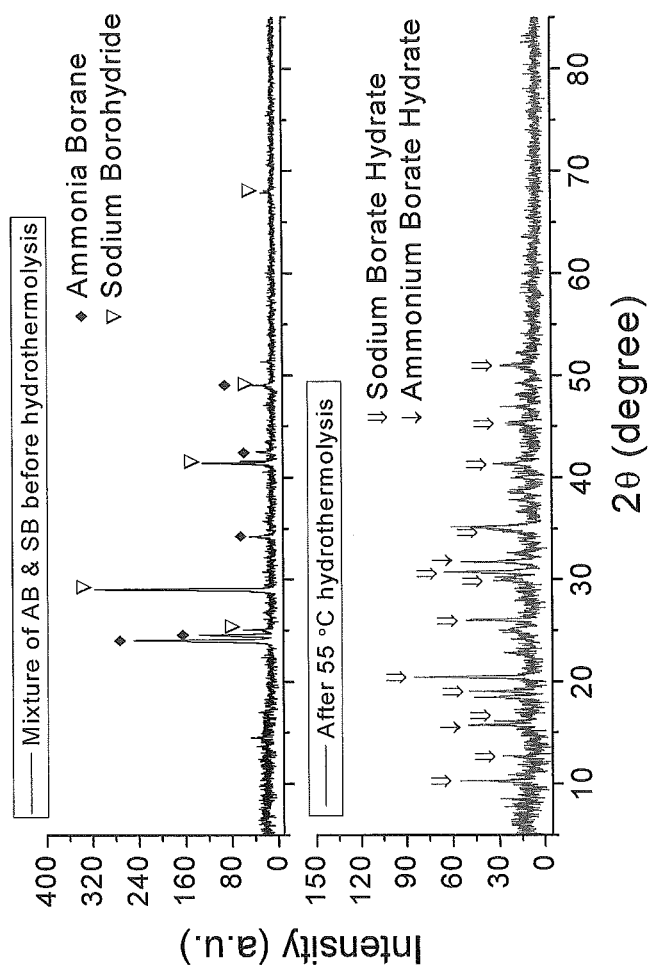
FIG. 6 are X-ray diffraction patterns showing the phase constituents of the mixture of ammonia borane and sodium borohydride before and after a hydrothermolysis operation.

X-ray diffraction can be conducted to examine the phase constituents of the mixture of ammonia borane and sodium borohydride before and after the hydrothermolysis operation. The results are based on an ABSB mixture of 60% ammonia borane obtained from isothermal dehydrogenation at 55° C., and are shown in FIG. 6. Before hydrothermolysis, only pristine ammonia borane and sodium borohydride can be identified in the spectrum. After hydrothermolysis, pristine ammonia borane and sodium borohydride are in tiny amount which is below detection limit; instead, both ammonium borate hydrate and sodium borate hydrate are readily observed in the products, which indicates stoichiometric completion of the hydrothermolysis reaction.

In some embodiments, a method for generating hydrogen from a nitrogen containing borane compound and active metal borohydride mixture, comprises the steps of: (a) mixing a nitrogen-containing borane compound and an active metal borohydride into a mixture; (b) combining the mixture with water vapor and heating the mixture and the water vapor to a temperature within a near ambient temperature range between 30° C. and 104° C. thereby producing a product gas comprising hydrogen; and (c) removing at least some of the water vapor or at least some other impurities or at least some of both the water vapor and other impurities from the product gas to produce a purified product gas. The nitrogen containing borane compound can be selected from a group consisting of: ammonia borane, hydrazine borane and amine boranes. The active metal borohydride can be selected from a group consisting of: $NaBH_4$, $LiBH_4$, $KBH_4$, $RbBH_4$, $Cs\ BH_4$, $Be(BH_4)_2$, $Mg(BH_4)_2$, $Ca\ Mg(BH_4)_2$, $Sr(BH_4)_2$ and $Ba(BH_4)_2$. The water vapor can provide a relative humidity within a range of 10% to a saturation humidity at a corresponding temperature during the heating. The mixture and the water vapor can be isothermally heated at a constant temperature within the near ambient temperature range. The constant temperature can be between 50° C. and 60° C. The mixture and water vapor can be dynamically heated at an increasing temperature over time within the near ambient temperature range. The mixture and the water vapor can be heated at a rate of above zero to 5° C./min. The mixture can have between 5 and 95 wt. % of the nitrogen-containing borane compound. The removing at least some of the water vapor can comprise one or both of condensing water vapor from the product gas and passing the product gas through a silica gel. The removing at least some impurities can comprise passing the product gas through a diluted sulfuric acid solution. The mixture and the water vapor can be combined and heated in a reaction chamber, and the method can further comprise purging the reaction chamber with an inert gas prior to heating the mixture and the water vapor. The mixture and the water vapor can be combined and heated in a reaction chamber, and the method can further comprise creating a vacuum or an inert gaseous atmosphere in the reaction chamber prior to heating the mixture and the water vapor. The mixture and the water vapor can be dynamically heated at an increasing temperature within the near ambient temperature range over a first time period and isothermally heated at a constant temperature within the near ambient temperature range over a second time period. The method can further comprise feeding the purified product gas to an anode of a polymer electrolyte membrane fuel cell. The nitrogen containing borane compound is ammonia borane, and the active metal borohydride is $NaBH_4$.

The following are examples of experiments performed using the dynamic hydrogen release method and the isothermal hydrogen release method.

Example 1: Dynamic Hydrogen Release Method (1) Preparation of ammonia borane and sodium borohydride mixture: mix ammonia borane and sodium borohydride together with ammonia borane of 60% in weight at room temperature by mechanical agitation for 10 minutes.
(2) Preparation of water vapor source: load 0.5 g of deionized water onto a 0.25 g cotton water carrier.
(3) Hydrogen release measurement: using the second dehydrogenating apparatus 116, load both the chemical hydrides contained in an open dry glass vial and water vapor source into the stainless steel reactor 21 with the water vapor source beneath the chemical hydrides. Seal the reactor 21 and attach pressure transducer 25 and thermocouple 26. Insert the reactor 21 into the electric furnace 22, and start heating the reactor 21 with a heating rate of 0.5° C./min until the cease of hydrogen release. Record the pressure and temperature changes during the whole process with time interval of 1 second. Calculate the release quantity based on the equation of:

$$C = \frac{\Delta P \cdot V \cdot M_{H_2}}{R \cdot T \cdot m_{AB+SB}}$$

Where $\Delta P$ is pressure change, V is the volume of reactor measured by He calibration, $M_{H_2}$ is the molar mass of hydrogen, R is gas constant, T is the temperature of reactor in Kelvin and $m_{AB+SB}$ is the total mass of ammonia borane and sodium borohydride.
(4) Purification of the produced gas: run the product gas through a condenser to reduce water vapor impurity. Force the product gas through 0.1 N sulfuric acid solution and silica gel to remove impurities of ammonia and water vapor.

Example 2: Isothermal Hydrogen Release Method (1) Preparation of ammonia borane and sodium borohydride mixture: mix ammonia borane and sodium borohydride together with ammonia borane of 60% in weight at room temperature by mechanical agitation for 10 minutes.
(2) Preparation of water vapor source: load 0.85 g of deionized water onto a 0.5 g of cotton water carrier.
(3) Hydrogen release measurement: using the first dehydrogenating apparatus 114, load both the chemical hydrides contained in an open dry glass beaker and water vapor source into the reactor flask 2. Flush the reactor flask 2 with dry $N_2$ for 10 minutes. Transfer the reactor flask 2 from ambient temperature into the oil bath 4 held at 55° C. Record the product gas volume collected in the burette 11 against time during the whole process, and monitor the temperatures of oil bath and ambient environment. Calculate the release quantity based on the equation of:

$$C = \frac{P \cdot \Delta V \cdot M_{H_2}}{R \cdot T \cdot m_{AB+SB}}$$

where P is the gas pressure inside the burette 11, $\Delta V$ is the volume of gas collected in the burette 11, $M_{H_2}$ is the molar mass of hydrogen, R is gas constant, T is the ambient temperature around the burette 11 in Kelvin and $m_{AB+SB}$ is the total mass of ammonia borane and sodium borohydride.

(4) Purification of the produced gas: run the product gas through the condenser 8 to reduce water vapor impurity. Force the product gas through 0.1 N sulfuric acid solution in the first impurities bottle 9 and silica gel in the second impurities bottle 10 to eliminate the impurities of ammonia and water vapor.

According The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

The scope of the claims should not be limited by the preferred embodiments set forth in the examples, but should be given the broadest interpretation consistent with the description as a whole.

What is claimed is:

1. A method for generating hydrogen from a nitrogen containing borane compound and active metal borohydride mixture, comprising the steps of:
   (a) mixing a nitrogen-containing borane compound and an active metal borohydride into a mixture;
   (b) combining the mixture with water vapor and heating the mixture and the water vapor to a temperature within a near ambient temperature range between 30° C. and 104° C. thereby producing a product gas comprising hydrogen; and
   (c) removing at least some of the water vapor or at least some other impurities or at least some of both the water vapor and other impurities from the product gas to produce a purified product gas.

2. The method as in claim 1 wherein the nitrogen containing borane compound is selected from a group consisting of: ammonia borane, hydrazine borane and amine boranes.

3. The method as in claim 1, wherein the active metal borohydride is selected from a group consisting of: $NaBH_4$, $LiBH_4$, $KBH_4$, $RbBH_4$, $Cs\ BH_4$, $Be(BH_4)_2$, $Mg(BH_4)_2$, $Ca\ Mg(BH_4)_2$, $Sr(BH_4)_2$ and $Ba(BH_4)_2$.

4. The method as in claim 1 wherein the water vapor provides a relative humidity within a range of 10% to a saturation humidity at a corresponding temperature during the heating.

5. The method as in claim 1 wherein the mixture and the water vapor are isothermally heated at a constant temperature within the near ambient temperature range.

6. The method as claimed in claim 5 wherein the constant temperature is between 50° C. and 60° C.

7. The method as in claim 1 wherein the mixture and the water vapor are dynamically heated at an increasing temperature over time within the near ambient temperature range.

8. The method as claimed in claim 7 wherein the mixture and the water vapor are heated at a rate of above zero to 5° C./min.

9. The method as in claim 1, wherein the mixture has between 5 and 95 wt. % of the nitrogen-containing borane compound.

10. The method as in claim 1 wherein the removing at least some of the water vapor comprises one or both of condensing water vapor from the product gas and passing the product gas through a silica gel.

11. The method as in claim 1 wherein the removing at least some impurities comprises passing the product gas through a diluted sulfuric acid solution.

12. The method as in claim 1 wherein the mixture and the water vapor are combined and heated in a reaction chamber, and the method further comprises purging the reaction chamber with an inert gas prior to heating the mixture and the water vapor.

13. The method as in claim 1 wherein the mixture and the water vapor are combined and heated in a reaction chamber, and the method further comprises creating a vacuum or an inert gaseous atmosphere in the reaction chamber prior to heating the mixture and the water vapor.

14. The method as in claim 1 wherein the mixture and the water vapor are dynamically heated at an increasing temperature within the near ambient temperature range over a first time period and isothermally heated at a constant temperature within the near ambient temperature range over a second time period.

15. The method as in claim 1 further comprising feeding the purified product gas to an anode of a polymer electrolyte membrane fuel cell.

16. The method as in claim 1 wherein the nitrogen containing borane compound is ammonia borane, and the active metal borohydride is $NaBH_4$.

17. The method as in claim 2, wherein the active metal borohydride is selected from a group consisting of: $NaBH_4$, $LiBH_4$, $KBH_4$, $RbBH_4$, $Cs\ BH_4$, $Be(BH_4)_2$, $Mg(BH_4)_2$, $Ca\ Mg(BH_4)_2$, $Sr(BH_4)_2$ and $Ba(BH_4)_2$.

18. The method as in claim 17 wherein the water vapor provides a relative humidity within a range of 10% to a saturation humidity at a corresponding temperature during the heating.

19. The method as in claim 18 wherein the mixture and the water vapor are isothermally heated at a constant temperature within the near ambient temperature range.

20. The method as claimed in claim 19 wherein the constant temperature is between 50° C. and 60° C.

21. The method as in claim 18 wherein the mixture and the water vapor are dynamically heated at an increasing temperature over time within the near ambient temperature range.

22. The method as claimed in claim 21 wherein the mixture and the water vapor are heated at a rate of above zero to 5° C./min.

23. The method as in claim 18, wherein the mixture has between 5 and 95 wt. % of the nitrogen-containing borane compound.

24. The method as in claim 23 wherein the removing at least some of the water vapor comprises one or both of condensing water vapor from the product gas and passing the product gas through a silica gel.

25. The method as in claim 24 wherein the removing at least some impurities comprises passing the product gas through a diluted sulfuric acid solution.

26. The method as in claim 25 wherein the mixture and the water vapor are combined and heated in a reaction chamber, and the method further comprises purging the reaction chamber with an inert gas prior to heating the mixture and the water vapor.

27. The method as in claim 26 wherein the mixture and the water vapor are combined and heated in a reaction chamber, and the method further comprises creating a vacuum or an inert gaseous atmosphere in the reaction chamber prior to heating the mixture and the water vapor.

28. The method as in claim 27 wherein the mixture and the water vapor are dynamically heated at an increasing temperature within the near ambient temperature range over a first time period and isothermally heated at a constant temperature within the near ambient temperature range over a second time period.

29. The method as in claim 28 further comprising feeding the purified product gas to an anode of a polymer electrolyte membrane fuel cell.

30. The method as in claim 29 wherein the nitrogen containing borane compound is ammonia borane, and the active metal borohydride is $NaBH_4$.

* * * * *